US011988020B2

(12) United States Patent
Promutico

(10) Patent No.: US 11,988,020 B2
(45) Date of Patent: May 21, 2024

(54) MODULAR DOOR-LOCK SYSTEM

(71) Applicant: BITRON S.P.A., Turin (IT)

(72) Inventor: Fabrizio Promutico, Turin (IT)

(73) Assignee: BITRON S.P.A., Turin (IT)

( * ) Notice: Subject to any disclaimer, the term of this patent is extended or adjusted under 35 U.S.C. 154(b) by 139 days.

(21) Appl. No.: 17/454,062

(22) Filed: Nov. 9, 2021

(65) Prior Publication Data

US 2022/0145665 A1 May 12, 2022

(30) Foreign Application Priority Data

Nov. 11, 2020 (IT) ........................ 102020000026906

(51) Int. Cl.

*E05B 47/00* (2006.01)
*E05B 65/00* (2006.01)
*E05C 3/02* (2006.01)
*F24C 15/02* (2006.01)

(52) U.S. Cl.

CPC .......... *E05B 47/0012* (2013.01); *E05B 65/00* (2013.01); *E05C 3/02* (2013.01); *F24C 15/022* (2013.01); *E05B 2047/0016* (2013.01); *E05B 2047/0017* (2013.01); *E05B 2047/002* (2013.01); *E05B 2047/0068* (2013.01); *E05B 2047/0069* (2013.01)

(58) Field of Classification Search

CPC .. E05C 5/00; E05C 2005/005; E05B 63/0052; E05B 63/18; E05B 63/182; E05B 63/20; E05B 2047/0016; E05B 2047/0067; E05B 2047/0068; E05B 2047/0069; D06F 37/28; D06F 39/14; F24C 15/022; A47L 15/4259

See application file for complete search history.

(56) References Cited

U.S. PATENT DOCUMENTS

| | | | | |
|---|---|---|---|---|
| 4,450,335 A * | 5/1984 | Shimizu | H05B 6/6417 | 219/723 |
| 4,516,007 A * | 5/1985 | Ringdahl | H01H 3/163 | 219/722 |
| 4,529,852 A * | 7/1985 | Lewandowski | H01H 3/163 | 200/51.09 |
| 4,663,505 A * | 5/1987 | Drake | H01H 3/163 | 219/722 |

(Continued)

FOREIGN PATENT DOCUMENTS

| | | |
|---|---|---|
| EP | 1212973 A1 | 6/2002 |
| EP | 3495590 A1 | 6/2019 |

OTHER PUBLICATIONS

Italian Search Report dated Jul. 21, 2021 of the counterpart Italian patent application.

*Primary Examiner* — Alyson M Merlino

(74) *Attorney, Agent, or Firm* — Platinum Intellectual Property PC

(57) ABSTRACT

The present invention relates to a door-lock system (S) for a household appliance, in which said household appliance is of the type comprising a frame and a door hinged to said frame, and in which said lock-door system (S) comprises: an engaging member (2), which can be fixed to said door of said household appliance, and comprising a prong (22) and a security member (23) arranged substantially parallel to said prong (22); and a door lock device (1).

The present invention also relates to an oven.

13 Claims, 17 Drawing Sheets

(56) References Cited

U.S. PATENT DOCUMENTS

| | | | | | |
|---|---|---|---|---|---|
| 4,745,250 | A * | 5/1988 | Mayo | H01H 3/163 | 219/722 |
| 5,672,857 | A * | 9/1997 | Frost | H01H 3/161 | 200/61.81 |
| 5,718,135 | A * | 2/1998 | Bertenshaw | E05B 47/0012 | 70/277 |
| 6,137,096 | A * | 10/2000 | Seo | H05B 6/6417 | 219/722 |
| 6,886,868 | B2 * | 5/2005 | Hengelein | D06F 39/14 | 292/201 |
| 7,032,939 | B2 * | 4/2006 | Magnusson | E05B 63/122 | 292/121 |
| 9,832,820 | B2 * | 11/2017 | Darney | E05B 47/026 | |
| 9,913,322 | B2 * | 3/2018 | Davies | H05B 6/6417 | |
| 2002/0062670 | A1 * | 5/2002 | Doong | E05B 47/0012 | 70/279.1 |
| 2010/0000273 | A1 * | 1/2010 | Viso Cabrera | E05B 47/0012 | 70/277 |
| 2010/0000274 | A1 * | 1/2010 | Viso Cabrera | E05B 47/026 | 70/278.7 |
| 2016/0160535 | A1 | 6/2016 | Haidvogl | | |
| 2018/0008120 | A1 | 1/2018 | Dirnberger et al. | | |

* cited by examiner

MODULAR DOOR-LOCK SYSTEM

RELATED APPLICATIONS

This application is a Non-provisional Application under 35 USC 111(a), which claims Italian Patent Application Serial No. 102020000026906, filed Nov. 11, 2020, the disclosure of all of which are hereby incorporated by reference in their entirety.

The present invention relates to a modular door-lock system.

FIELD OF THE INVENTION

More in detail, the invention relates to a door-lock system in which it is possible to install several door lock systems, designed and manufactured in particular for domestic and industrial ovens.

In the following, the description will be addressed to the application for ovens, but it is quite clear that the same should not be considered limited to this specific use.

PRIOR ART

As is well known, there are currently different types of ovens. For example, microwave, pyrolytic, high-end ovens, and the like are known. In some ovens, such as pyrolytic ones, it is necessary to have a closing system that is particularly safe, in consideration of the high temperatures of the oven. On the other hand, for example, high-end ovens have an automatic closing and opening system.

Generally, ovens are equipped with a maximum of two hooking points. Therefore, a maximum of two door-lock modules are required, generally referred to as "top module" and "bottom module", that is respectively upper module and lower module. In less expensive ovens it is also possible to use only one of the two aforementioned modules to keep the door closed.

For all these different types of ovens, different types of door-locks are required, possibly equipped with different systems for closing and retaining the door.

Obviously, in this case, the door-lock devices must be made in such a way as to adapt to the different needs. This implies that manufacturers must include in their catalog many different types of door-lock devices, each suitable for different needs and types of ovens.

It is clear that this procedure is expensive in economic terms, because, for example, as is known, for the realization of each door-lock device it is necessary to design a container, for which it is necessary to obtain a specific mold, which as it is known has a high cost, and arrange the different components.

SCOPE OF THE INVENTION

In light of the above, it is, therefore, an object of the present invention to propose a door-lock device that can be configured according to the installation requirements in specific apparatuses or household appliances, in particular ovens and the like.

A further object of the present invention is to propose a door-lock device, which can have a single architecture and which can therefore be used, according to how it is equipped, as a top module, or an upper module, or a bottom module, or a lower module.

Another object of the invention is to propose a door-lock device that can be easy to assemble.

OBJECT OF THE INVENTION

It is therefore specific object of the invention, a door-lock system for a household appliance, wherein said household appliance is of the type comprising a frame and a door hinged to said frame, and wherein said door-lock system comprises: an engaging member, fixable to said door of said household appliance, and comprising a prong and a security member arranged substantially parallel to said prong; and a door-lock device, comprising a containment casing fixable to the frame of said household appliance, a blocking group, intended to engage with and hold said engaging member, which in its turn comprises a rotating hook, arranged within said containment casing, and capable of moving from a resting position, wherein said prong is not engaged with said rotating hook, to an operating position, wherein said prong is engaged and blocked with said rotating hook, so as to hold said door closed; a blocking member, related to said rotating hook, such that, when said rotating hook is in said resting position, said blocking member assumes a closing position, preventing the insertion of said security member within said door-lock device, and that, when said rotating hook is in said operating position, said blocking member assumes an opening position, allowing the insertion of said security member within said door-lock device; and a security detecting unit, configured to interact with said security member, so as to detect when said security member is engaged or disengaged with said door-lock device.

Advantageously according to the invention, said containment casing may comprise a base and a lid, arranged on said base, for closing said containment casing, wherein said base has a first opening and a second opening arranged alongside said first opening, said prong may be insertable in said first opening, and said security member may be insertable in said second opening, and said blocking member may be arranged in the proximity of said second opening and it is connected to said rotating hook.

Still according to the invention, said door-lock system may comprise a sliding guide, fixed to said base of said containment casing, wherein said blocking member comprises a first portion having an opening, and a second portion, fixed to said first portion and comprising a guide for said rotating hook, and said first portion is constrained to slide along said sliding guide so that, when said blocking member is in said closing position, said second opening and said opening are not overlapping with each other, preventing the insertion of the security member through the second opening, and that, when said blocking member is in said opening position, said second opening and said opening are at least partially overlapping with each other, allowing the insertion of said security member through the second opening and said opening.

Always according to the invention, said rotating hook may comprise a third free pin constrained to said guide of said second portion so that, when said rotating hook is in said resting position, said blocking member assumes a closing position, and that, when said rotating hook is in said rotating position, said blocking member assumes an opening position.

Further according to the invention, said security detecting unit may comprise a second microswitch and a third microswitch, and a second rod arranged on one side of said base, wherein each of said second and third microswitch is configured for detecting if said security member interferes or does not interfere with said second rod.

Conveniently according to the invention, said door-lock system may comprise a closing detecting unit having a first microswitch configured for detecting if said rotating hook is engaged or disengaged with said prong.

Advantageously according to the invention, said blocking group may comprise a supporting and guiding element comprising a guide fixed to said of said containment casing, wherein said rotating hook may comprise a second free pin constrained to said supporting and guiding element in such a way so as to allow said rotating hook to move from said resting position to said operating position.

Always according to the invention, said rotating hook may comprise a first pin around which said rotating hook is capable of rotating, and said blocking group may comprise a fourth pin, and a lever having one end connected, by means of said first pin, to said rotating hook and another end fixed, by means of said fourth pin, to said base of said containment casing.

Still according to the invention, said door-lock system may comprise a retrieving group for retrieve said door of said household appliance on closing, wherein said retrieving group comprises a slider, a gear wheel, engaged with said slider, a mother screw engaged with said gear wheel, and an electric engine, whose shaft is coupled with said mother screw, so that, when in use, said electric engine causes the rotation of said mother screw and, thus, of said gear wheel, so that said slider is moved along a direction A.

Advantageously according to the invention, said retrieving group may comprise a first rod, whose free end is in proximity of said rotating hook, wherein said first rod is movable along said direction A.

Always according to the invention, said engaging member may comprise a plate for fixing said engaging member to said door of said household appliance, wherein said prong is fixed to said plate and said security member, also fixed to said plate, has the shape of a bar and is arranged substantially parallel to said prong.

Conveniently according to the invention, said blocking member may be a sliding wall.

It if further object of the present invention an oven comprising a frame, into which a cooking chamber is defined, a door hinged to said frame for closing said cooking chamber, and a door-lock system, wherein said engaging member is fixed to said door, and wherein said door-lock device is removably coupled with said engaging member.

Advantageously according to the invention, said door-lock system may be is arranged in the lower or upper part of said door.

Still according to the invention, said oven may comprise a door-lock system arranged in said lower part of said door and a door-lock system arranged in said upper part of said door.

BRIEF DESCRIPTION OF THE FIGURES

The present invention will be now described, for illustrative but not limitative purposes, according to its preferred embodiments, with particular reference to the figures of the enclosed drawings, wherein.

In the various figures, similar parts will be indicated with the same numerical references.

DETAILED DESCRIPTION

Figure 1:
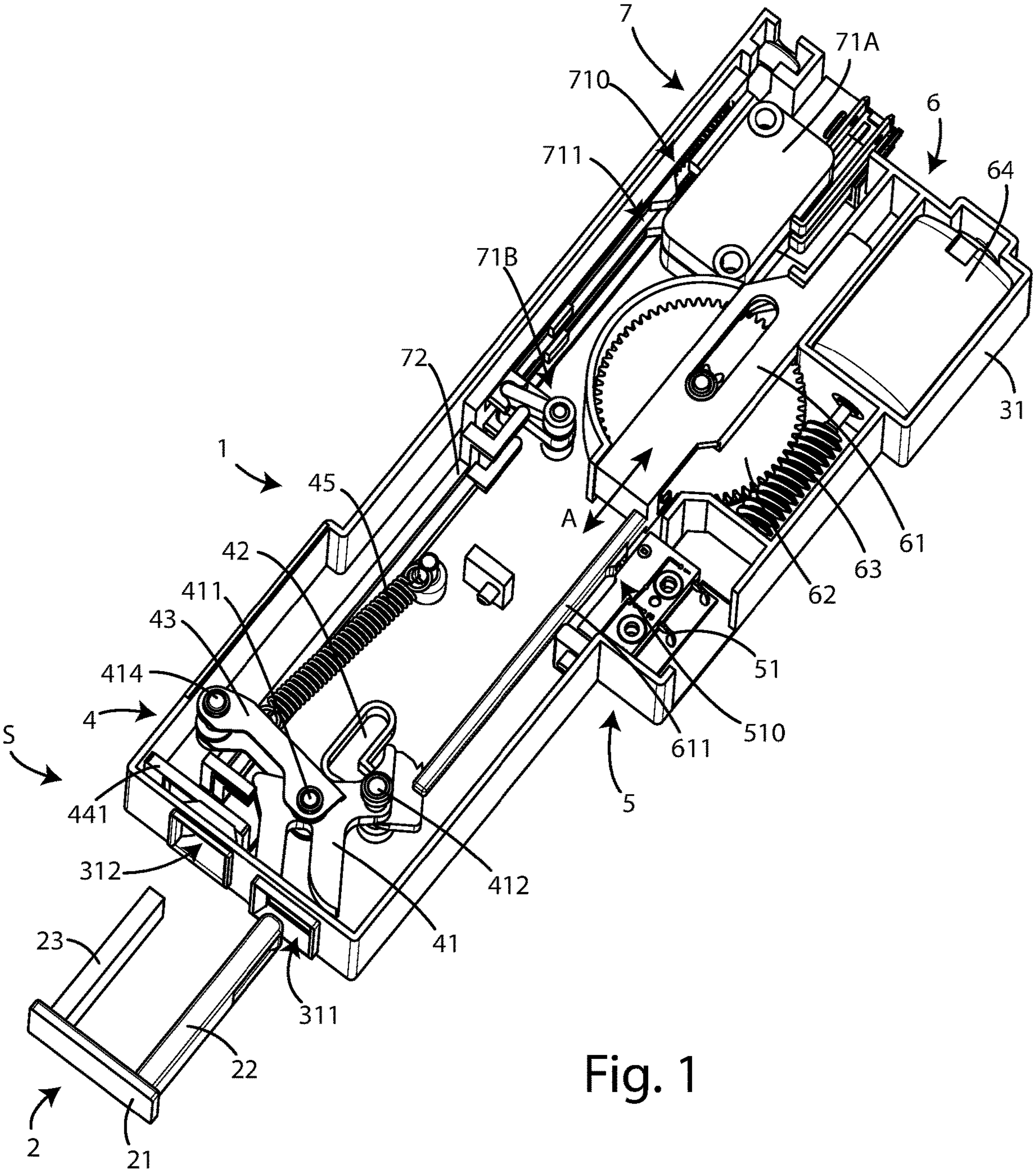
FIG. 1 shows a top perspective view of a first embodiment of a door-lock system comprising a door-lock device, in an open configuration, and a coupling member decoupled from the door-lock device, according to the present invention.

With reference to FIGS. 1-8, a first embodiment of the door-lock system according to the present invention is observed, indicated as a whole with the reference S.

The door-lock system essentially comprises a door-lock device 1, of the modular type, and a hooking or engaging member 2, which can be fixed to a door of a household appliance, in particular an oven (not shown in the figures), and which can be removably coupled to the door lock device 1.

In particular, said engaging member 2 has a plate 21, for fixing to the door of the oven or of the household appliance in general, a prong 22, fixed to said plate 21, and a security member 23, also fixed to said plate 21, which operation will be better defined below.

Said security member 23 has the shape of a bar and is arranged substantially parallel to the prong 22.

Figure 2:
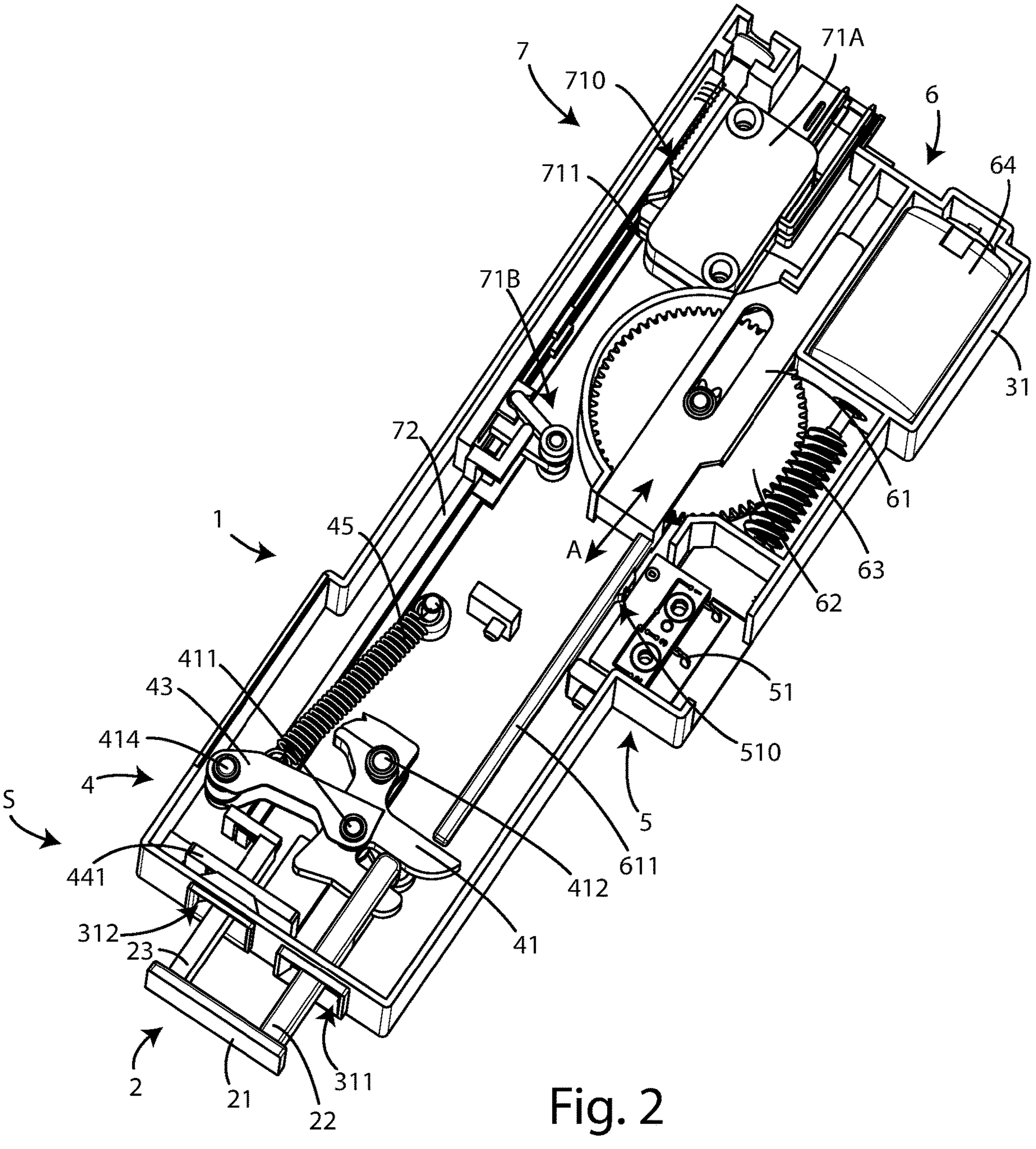
FIG. 2 shows, in a perspective view from above, the door-lock system of FIG. 2, in which the engaging member is coupled to the door-lock device, according to the present invention.
Figure 3:
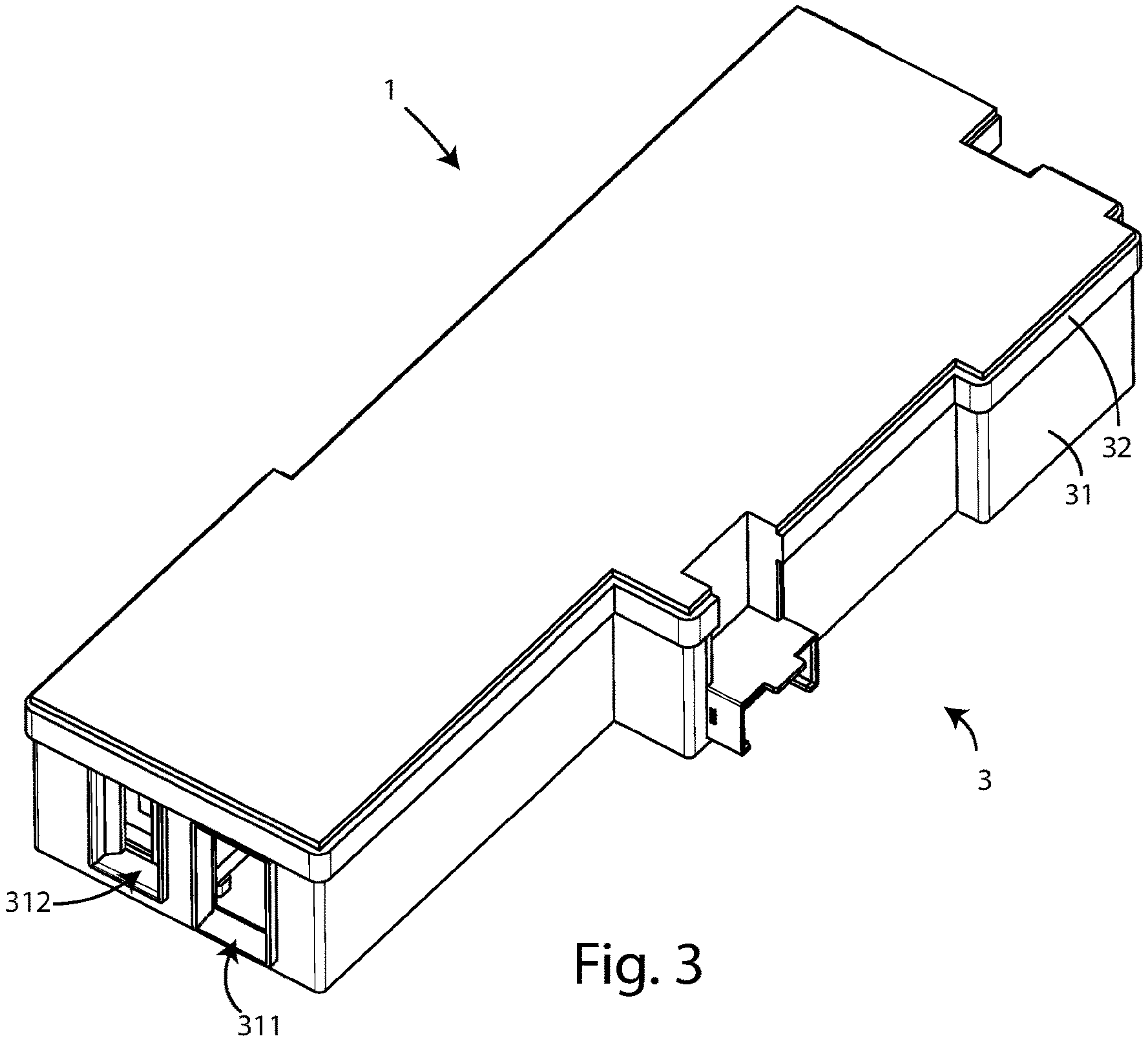
FIG. 3 shows the door-lock device according to FIGS. 1-2, in a closed configuration.

As can be seen from FIGS. 1-3, the door-lock device 1 comprises a containment casing 3 for housing the components of the door-lock device 1, and a blocking group 4, intended to engage and hold the hook 2 of said oven door.

Furthermore, the door-lock device 1 comprises a closing detection unit 5, to detect the engagement state of the blocking group 4 with the prong 22 and, therefore, the closure of the door of the household appliance, a retrieving group 6, to return the household appliance door back to close, and a safety detection unit 7, to detect when the security member 23 is engaged with the door-lock device 1 and, therefore, the household appliance door is closed.

Figure 4:
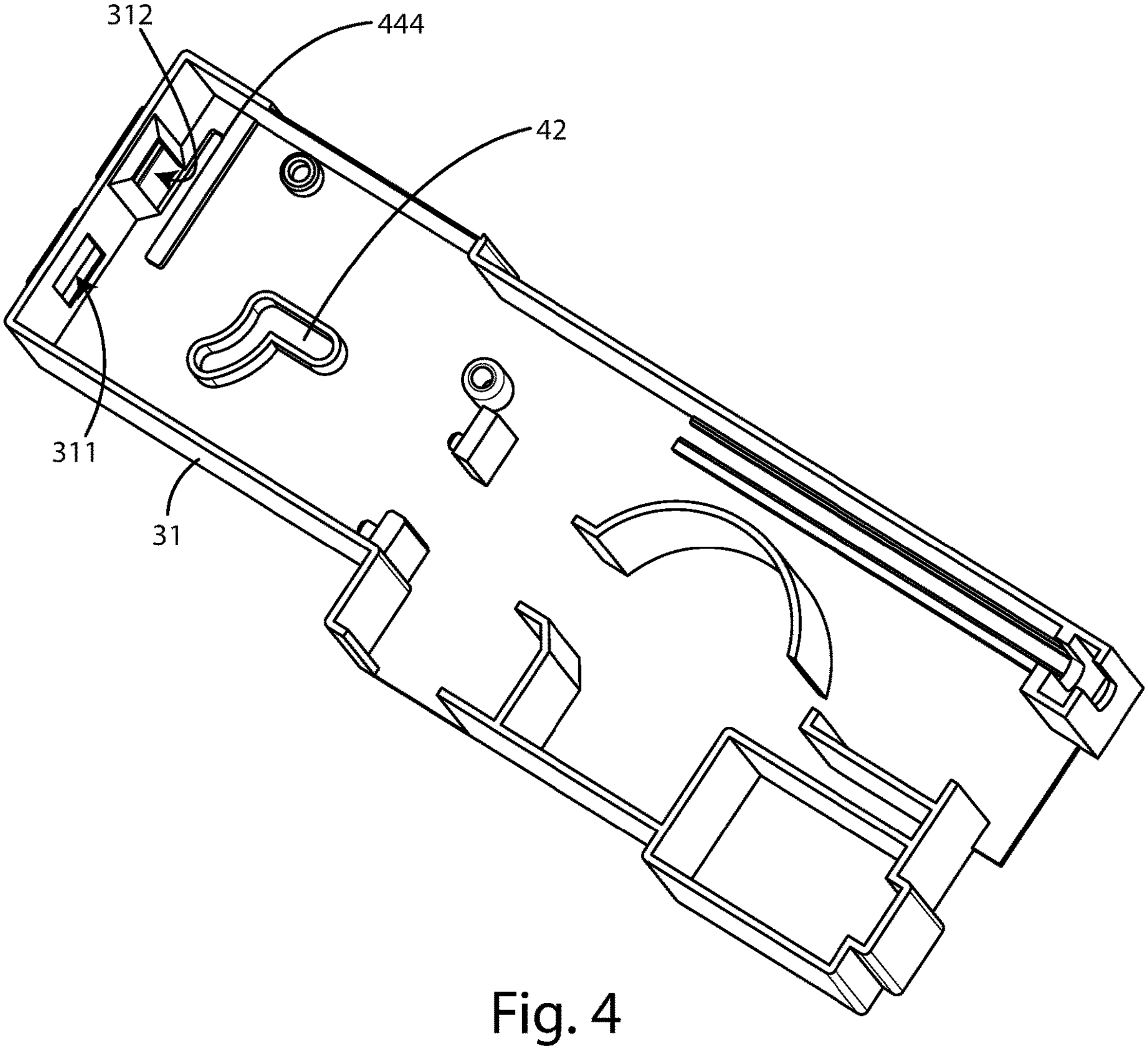
FIG. 4 shows a base of the door lock device, according to the present invention.

With particular reference to FIGS. 3 and 4, the containment casing 3 comprises a base 31, to contain the components of the door lock 1, and a lid 32, arranged on said base 31 to close the containment casing 3.

More specifically, said base 31 has on one side a first opening 311, into which the prong 22 of said hooking member 2 can be inserted, and a second opening 312, into which the safety element 23 of said engaging member 2 can be inserted, as will be better explained below.

The blocking group 4 comprises a rotating hook 41, configured to engage with the prong 22 when the latter is inserted into the opening 311, so as to rotate around a first pin 411 of said rotating hook 41.

In particular, the prong 22 has an opening 221, in which a portion of said rotating hook 41 can be inserted in such a way as to allow, as mentioned, the rotating hook 41, when in use, to engage with said prong 22.

Said rotating hook 41 also comprises a second free pin 412, the operation of which will be better explained below.

Furthermore, said blocking group 4 also comprises a support and guide element 42 comprising an "L"-shaped guide, fixed to said base 31 of said containment casing 3.

In particular, the second free pin 412 is constrained to said "L"-shaped guide of said support and guide element 42 in such a way as to allow said rotating hook 41 to pass from a first position or rest or disengagement position to an operating position, in which it is engaged with the prong.

Figure 5A:
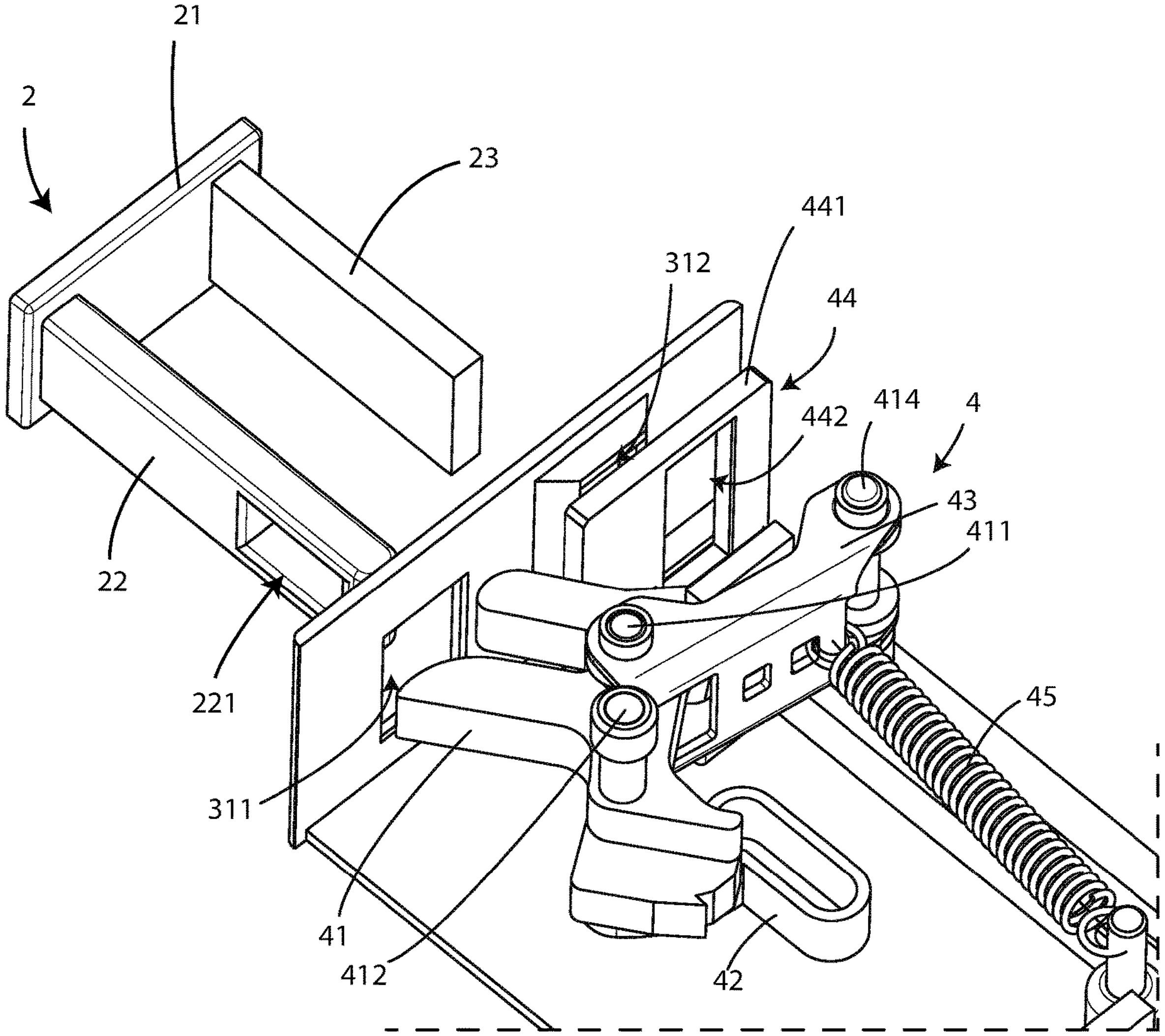
FIG. 5A shows, in a perspective and detail view, the lock-door system of FIG. 1, wherein the engaging is in an inoperative position and a blocking group is in a rest position.
Figure 5B:
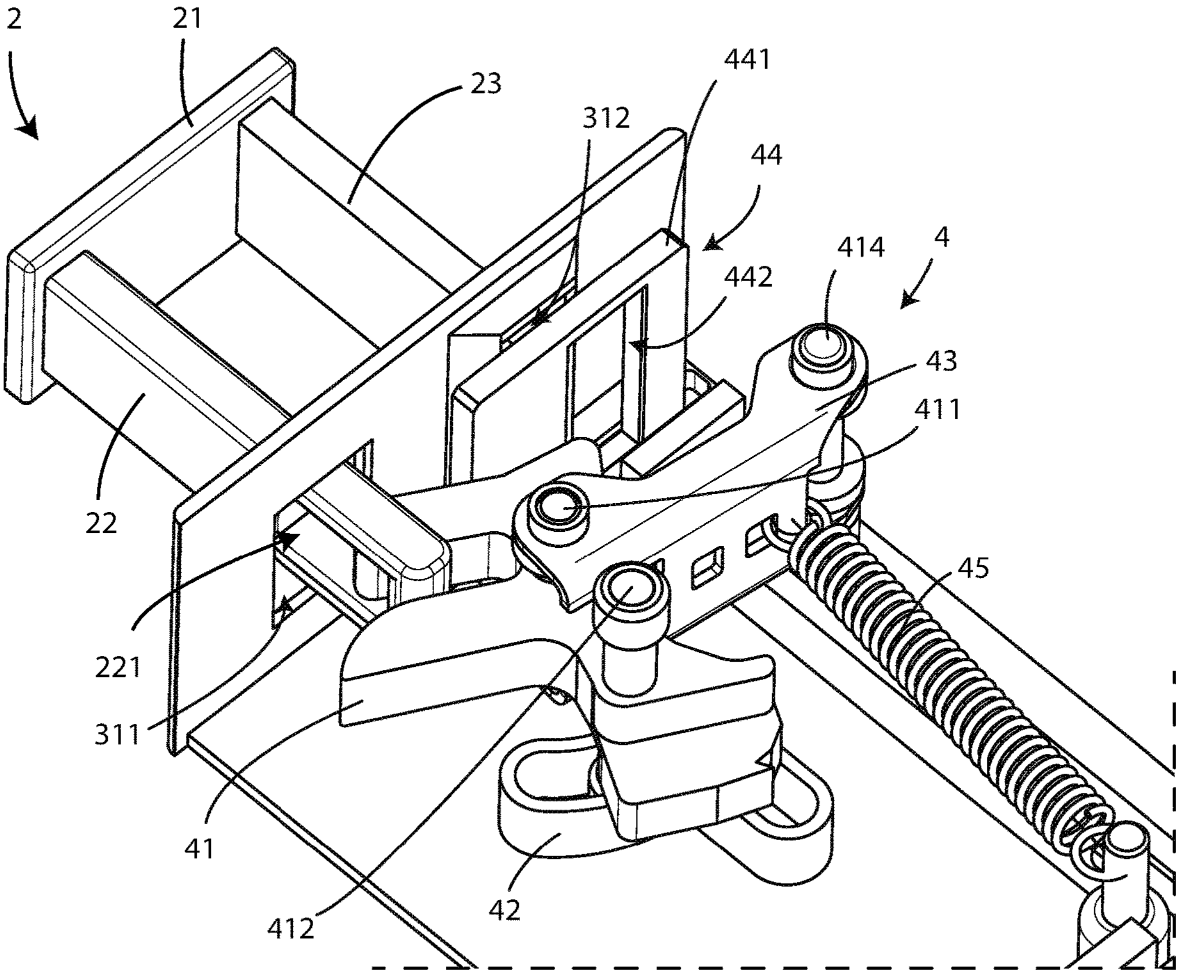
FIG. 5B shows, in a perspective view and in detail, the coupling member in a first operating position, in which it is arranged coupled to the blocking group, according to the present invention.
Figure 5C:
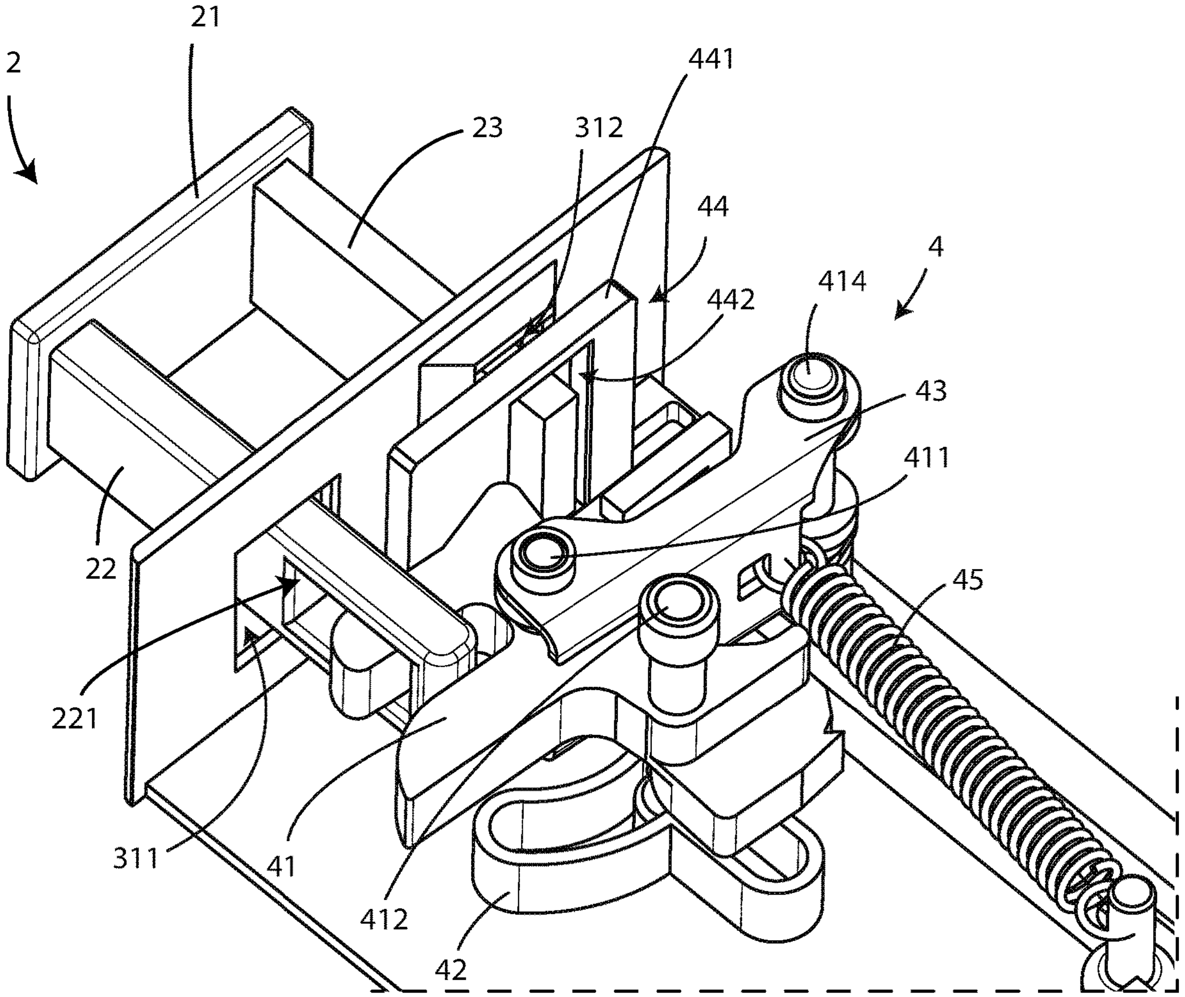
FIG. 5C shows, in a perspective view and in detail, the engaging member in a second operating position, in which it is coupled to the blocking group, according to the present invention.
Figure 5D:
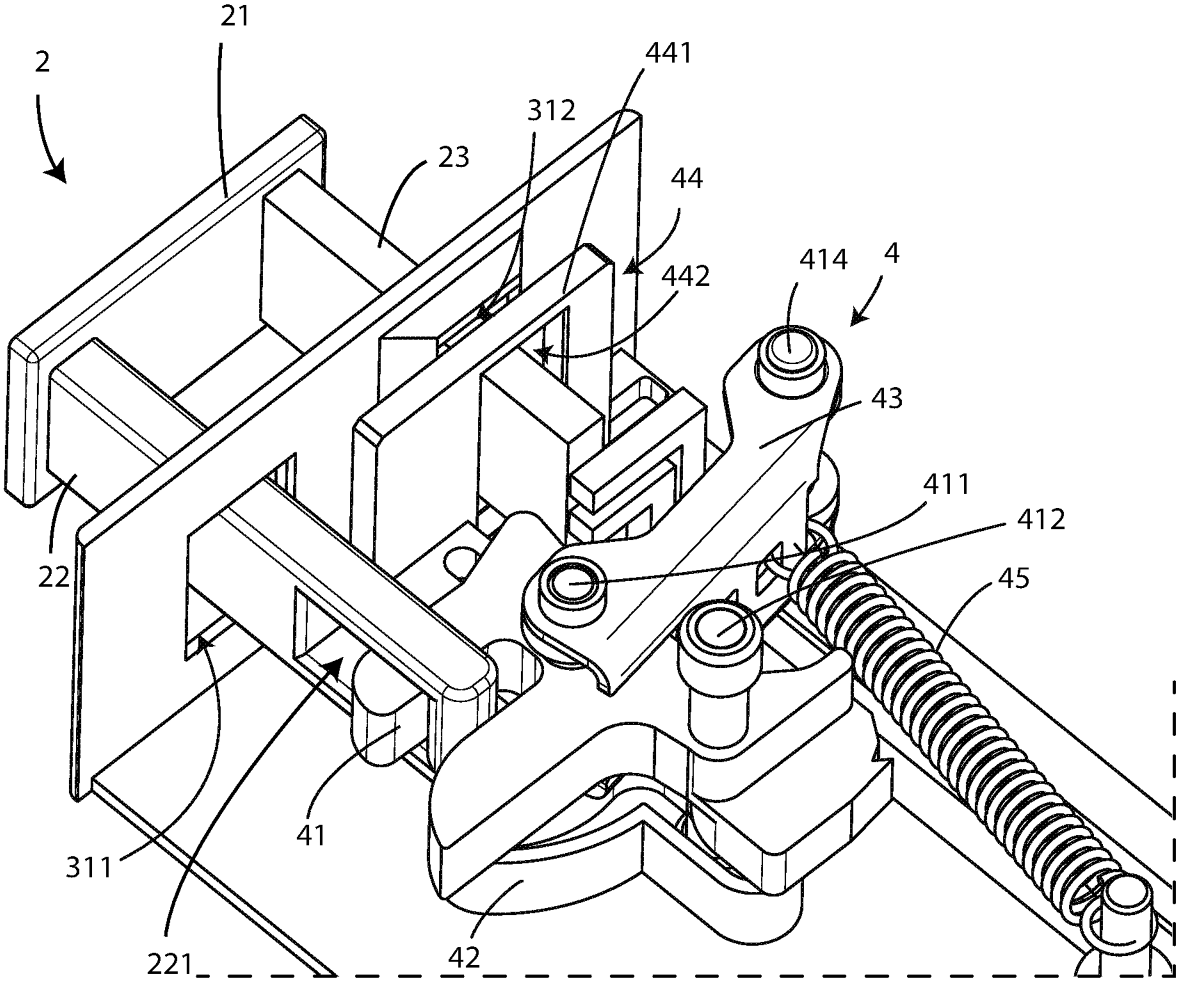
FIG. 5D shows in perspective view and in detail, the coupling member in a third operative position, in which it is coupled and held by the blocking group and the blocking group is in an operative position, according to the present invention.
Figure 6A:
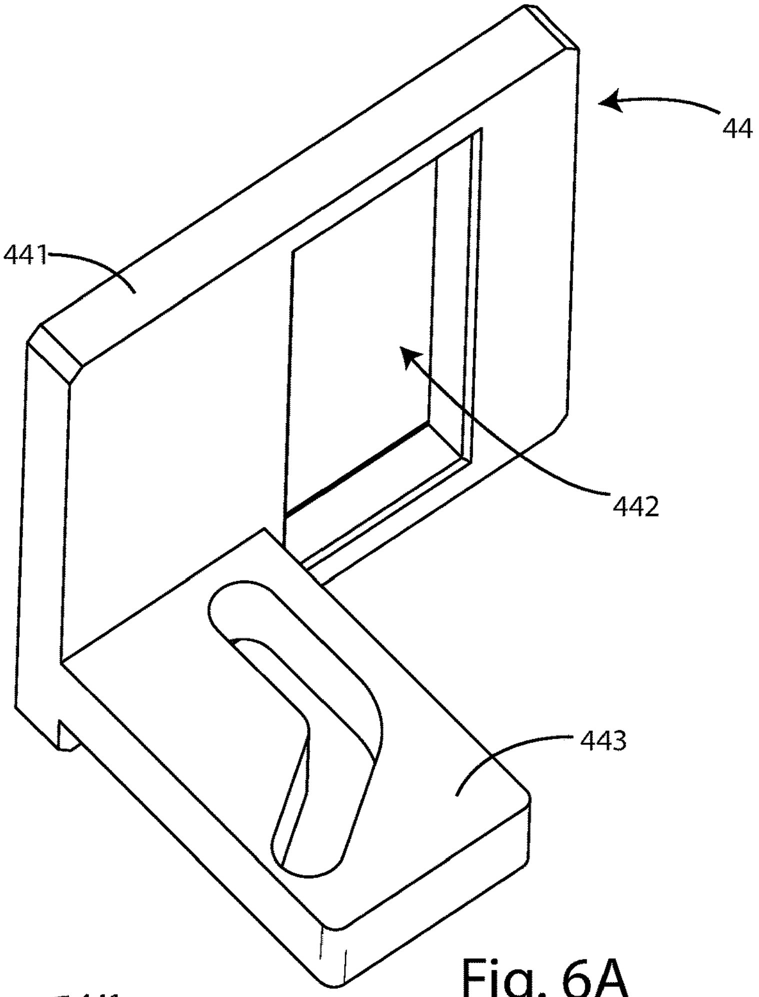
FIG. 6A shows a first perspective view of a blocking member, which can be coupled to the blocking group, according to the present invention.
Figure 6B:
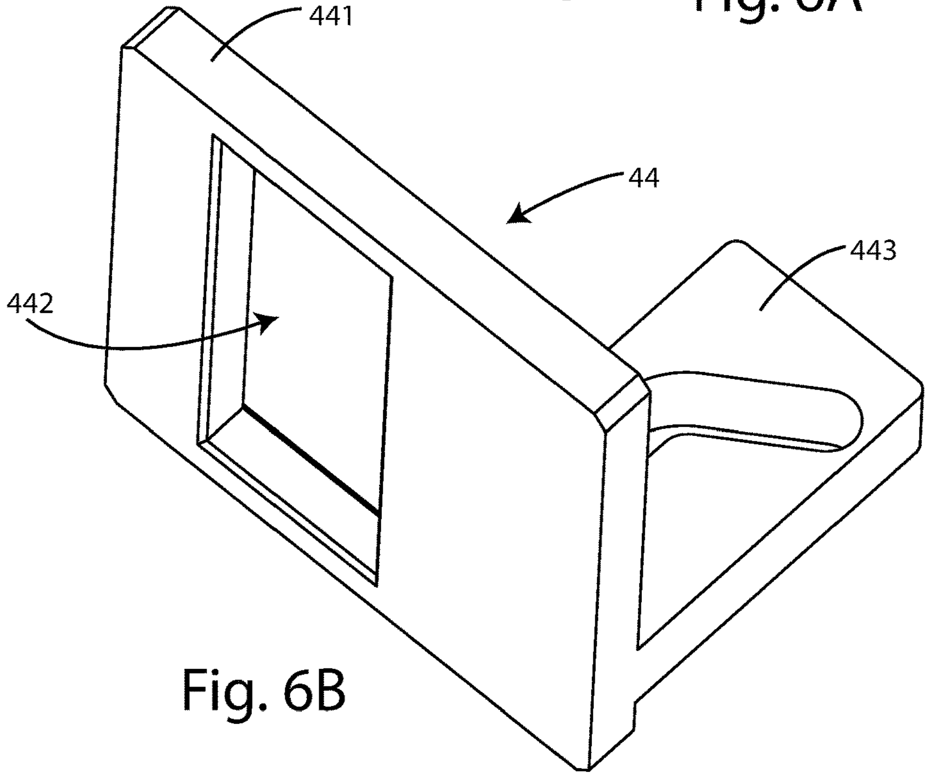
FIG. 6B shows a second perspective view of the blocking member of FIG. 6A.
Figure 7A:
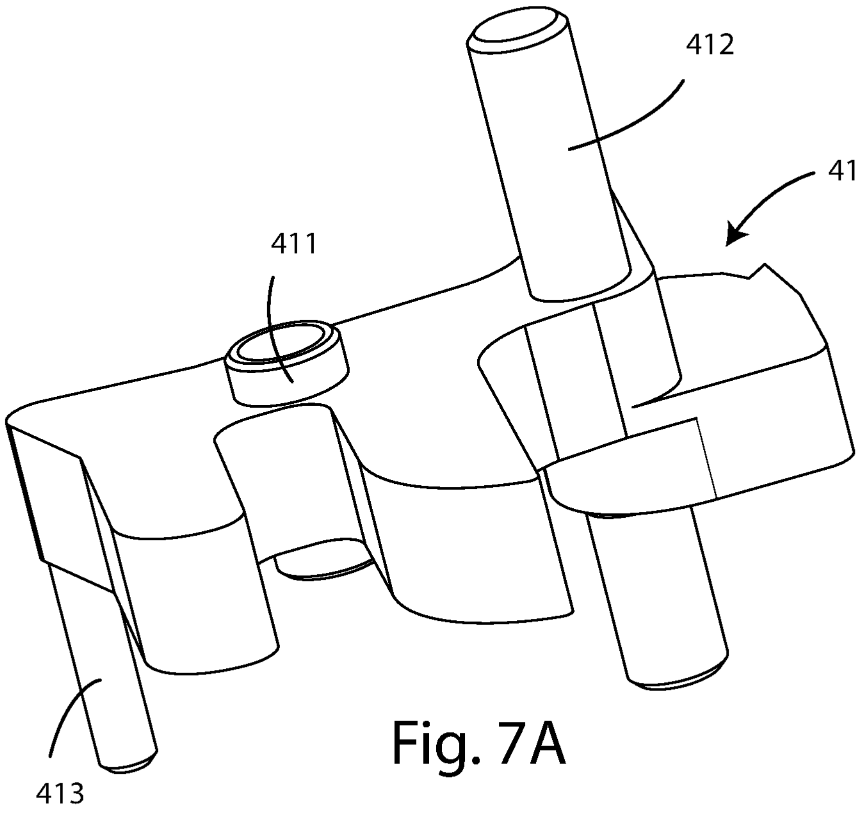
FIG. 7A shows a perspective view of a rotating hook of the blocking group, according to the present invention.
Figure 7B:
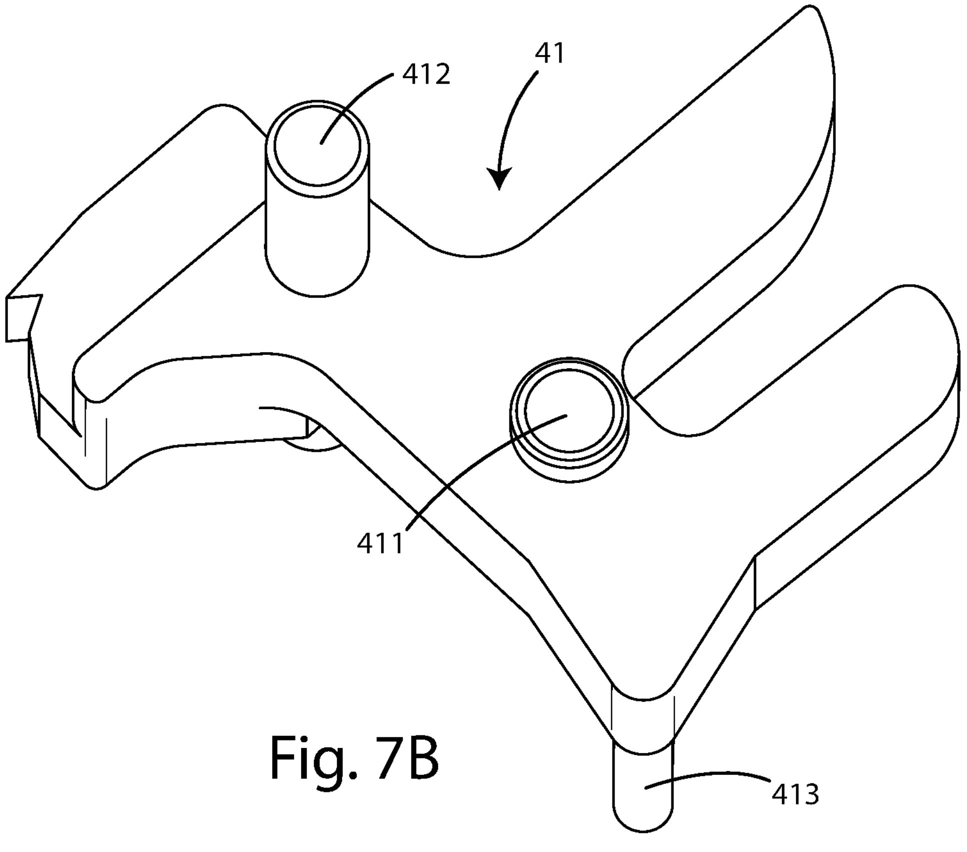
FIG. 7B shows a top perspective view of the rotating hook of FIG. 7A.

More specifically, as can be seen from FIG. 5A, when the rotating hook 41 is in the rest position, the prong 22 is not engaged with the rotating hook 41, while, with reference to FIG. 5D, when the rotating hook 41 is in the operating position, the prong 22 is engaged and held by the rotating hook 41.

As will be better described in the following, as can be seen from FIG. 5B, said rotating hook 41 passes from the rest position to the operating position by means of an intermediate positioning, in which the rotating hook 41 is engaged but not locked with the prong 22, when the latter is inserted into opening 311.

Furthermore, the blocking group 4 comprises a lever 43 having one end connected, by means of the first pin 411, to said rotating hook 41 and the other end fixed to the base 31 of the containment casing 3 by means of a fourth pin 414.

Figure 8:
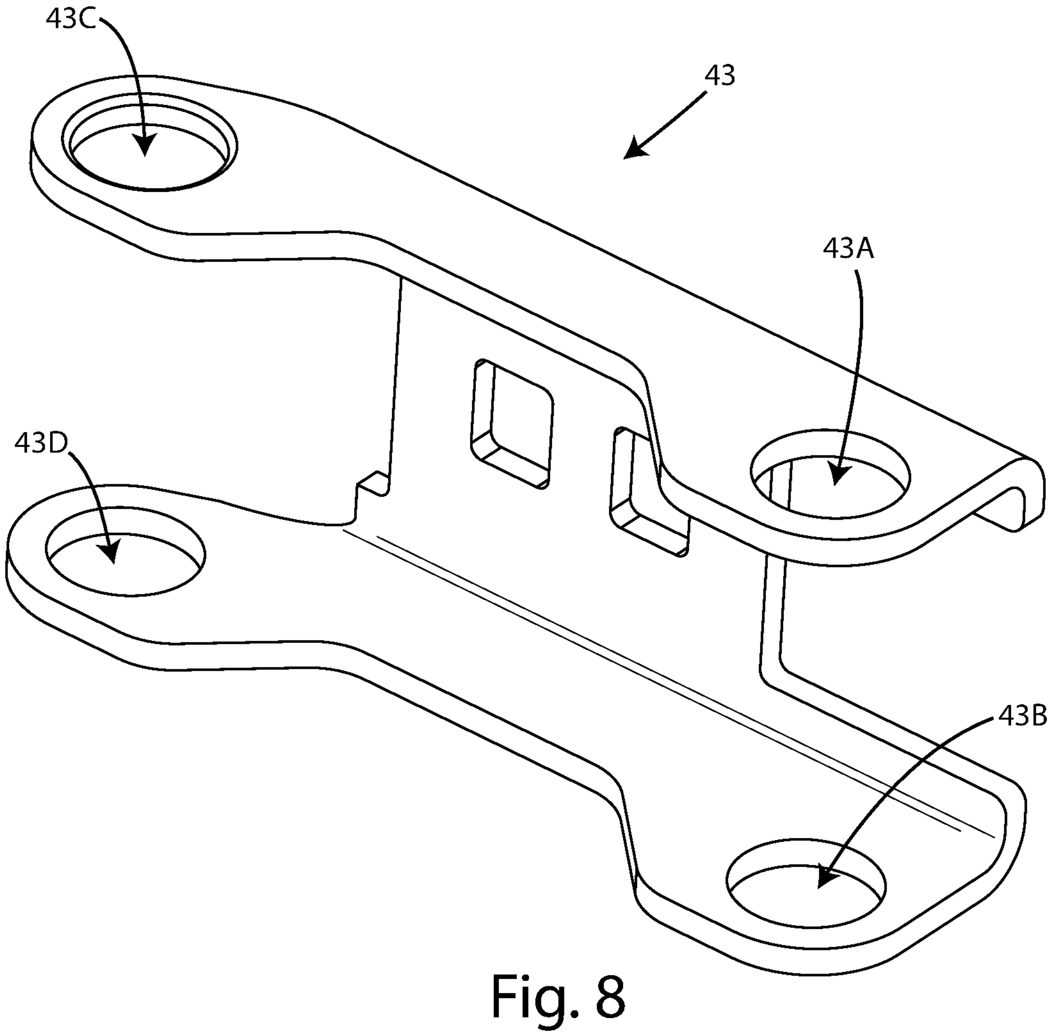
FIG. 8 shows, in perspective view, a lever which can be coupled to the rotating hook, according to the present invention.

In particular, as can be seen from FIG. 8, the lever 43 comprises a pair of openings 43A, 43B at one end, and a further pair of openings 43C, 43D at the other end.

More specifically, the openings 43A, 43B are arranged in such a way as to allow the insertion of said first pin 411, while the openings 43C, 43D are arranged in such a way as to allow the insertion of said fourth pin 414.

As can be seen from FIGS. 5A-6B, the blocking unit 4 comprises a blocking member 44, arranged in proximity to the second opening 312 of said base 31 and connected to said rotating hook 41, as will be better explained hereinafter.

In the embodiment described, this locking member 44 is a bulkhead or sliding wall. However, the blocking member 44 can be different from said bulkhead or sliding wall without thereby departing from the scope of protection of the present invention.

In particular, the blocking member 44 comprises a first portion 441 having an opening 442, and a second portion 443, fixed to said first portion 441 and comprising a guide for said rotating hook 41.

More specifically, the rotating hook 41 comprises a third free pin 413 arranged constrained to said guide of said second portion 443, so that, when said rotating hook 41 is in the rest position or in the intermediate position, the blocking member 44 assumes a closing position, in which the first portion 441 at least partially obstructs the insertion of said security member 23 into the second opening 312, and, when the rotating hook 41 is in the operative position, the blocking member 44 assumes an opening position, in which the first portion 441 allows the insertion of said security member 23 into the second opening 312.

As will be better described below, in fact, the movement of said blocking member 44 is synchronized with the movement of the rotating hook 41, so that only when the rotating hook 41 is engaged and locked with the prong 22, the blocking member 44 "discovers" the opening 312, also allowing the insertion of the safety organ 23 in the door-lock device 1.

Said blocking group 4 also comprises a sliding guide 444, fixed to said base 31 of said containment casing 3.

In particular, the first portion 441 is constrained to slide along said sliding guide 444 in such a way as to allow said blocking member 44 to pass from the closed position to the open position when, respectively, the rotating hook 41 passes from the rest position to the operating position.

More specifically, when the blocking member 44 is in the closed position, the second opening 312 of said base 31 and the opening 442 of said first portion 441 are not overlapped on each other, not allowing the insertion of the security member 23 through the second opening 312. In fact, in this case the second opening 312 is obstructed or blocked by the first portion 441 of said blocking member 44.

When, on the other hand, the blocking member 44 is in the open position, the second opening 312 of said base 31 and the opening 442 of said first portion 441 are at least partially overlapped on each other, allowing the insertion of said security member 23 through the second opening 312 and then through the opening 442.

In the embodiment described, the overlap between the second opening 312 and the opening 442 is a total overlap.

However, in other embodiments of the present invention, the overlap between the second opening 312 and the opening 442 can be also partial.

Furthermore, the blocking group 4 comprises a spring 45, having one end connected to said base 31, and the other end fixed to the lever 43. The operation of said spring 45 will be better explained below.

The retrieving group 6 comprises a slider 61, a toothed wheel 62, engaged with said slider 61, and a first rod 611, the free end of which is located in proximity to said rotating hook 41, and the operation of which will be better explained below.

Furthermore, said retrieving group 6 also comprises a lead screw 63 engaged with said toothed wheel 62 and an electric motor 64, the shaft of which is keyed with said lead screw 63.

The activation of said electric motor 64 causes the rotation of the lead screw 63 and, therefore, of the toothed wheel 62, so that said slider 61 is moved in the directions indicated by the arrow A.

The closing detection unit 5 comprises a first microswitch 51, which interferes with said first rod 611 of said slider 61.

As said, the first microswitch 51 is capable of detecting the engagement or disengagement status of the rotating hook 41 with the prong 22 and, therefore, the closing or opening of the household appliance door respectively.

More in detail, the first microswitch 51 allows detecting the movement of said first rod 611 by means of a cam 510, which is able to act, in use, on the button of the microswitch 51 to change the state of the contacts (not shown in the figures). Therefore, said first microswitch 51 allows detecting the interference of said first rod 611 with said rotating hook 41.

The safety detection unit 7 comprises a second microswitch 71A, a third microswitch 71B and a second rod 72 arranged, with respect to said first rod 611, on the opposite side of said base 31.

In particular, the second 71A and the third 71B microswitches are capable of detecting when the security member 23 is engaged or disengaged with the door-lock device 1.

More in detail, the second 71A and the third 71B microswitches allow detecting the movement of said second rod 72 by means of a cam 710 and a further cam 711, which are able to act, in use, on the buttons of the respective microswitch 71A, 71B to change the status of the contacts (not shown in the figures). Therefore, the second 71A and the third 71B microswitches allow detecting the interference of said second rod 72 with said rotating hook 41 with said security member 23.

Figure 9:
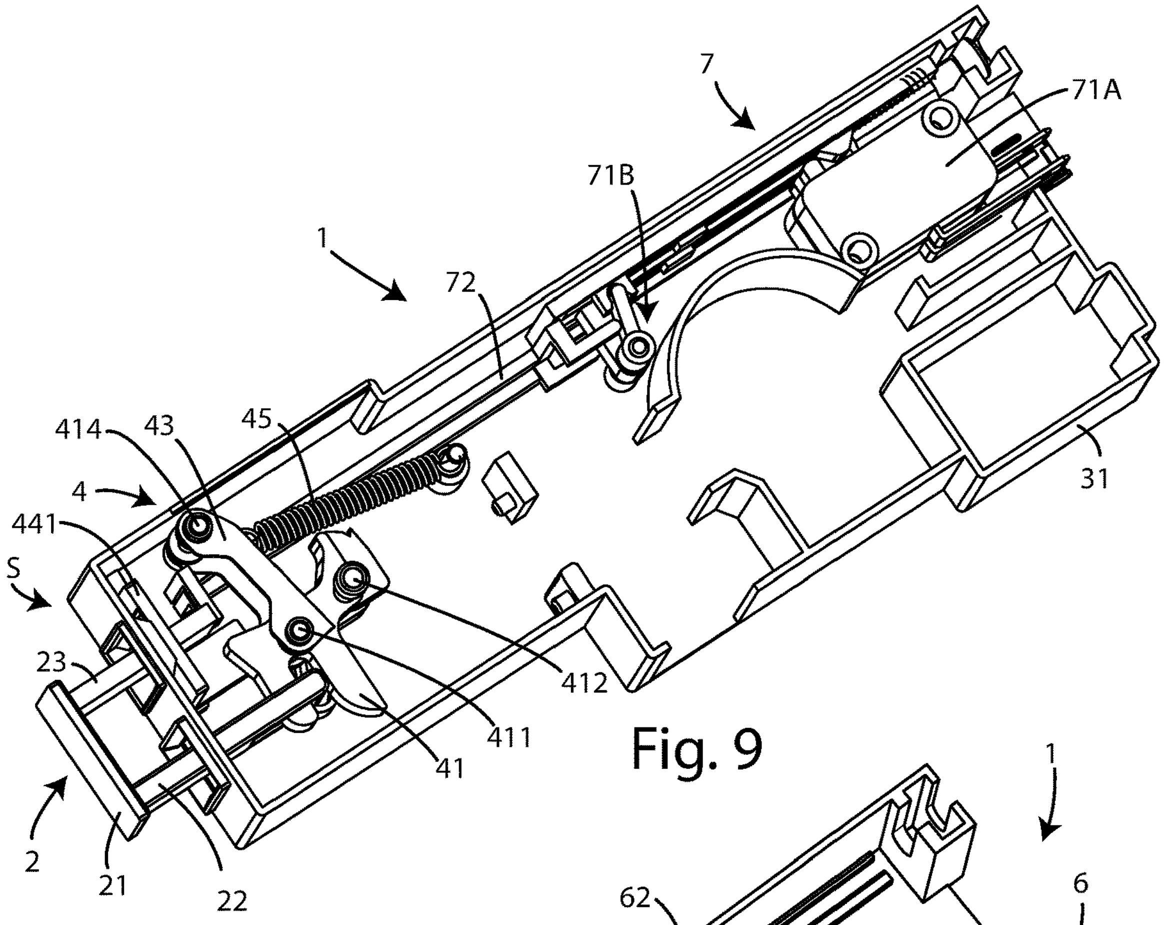
FIG. 9 shows a top perspective view of a second embodiment of the door-lock system, in which the door-lock device has not a closing detection unit and a retrieving group.

As anticipated, FIG. 9 shows a second embodiment of the door-lock system S according to the present invention, in which the door-lock device 1 is without the closing detection unit 5 and the retrieving group 6.

Figure 10:
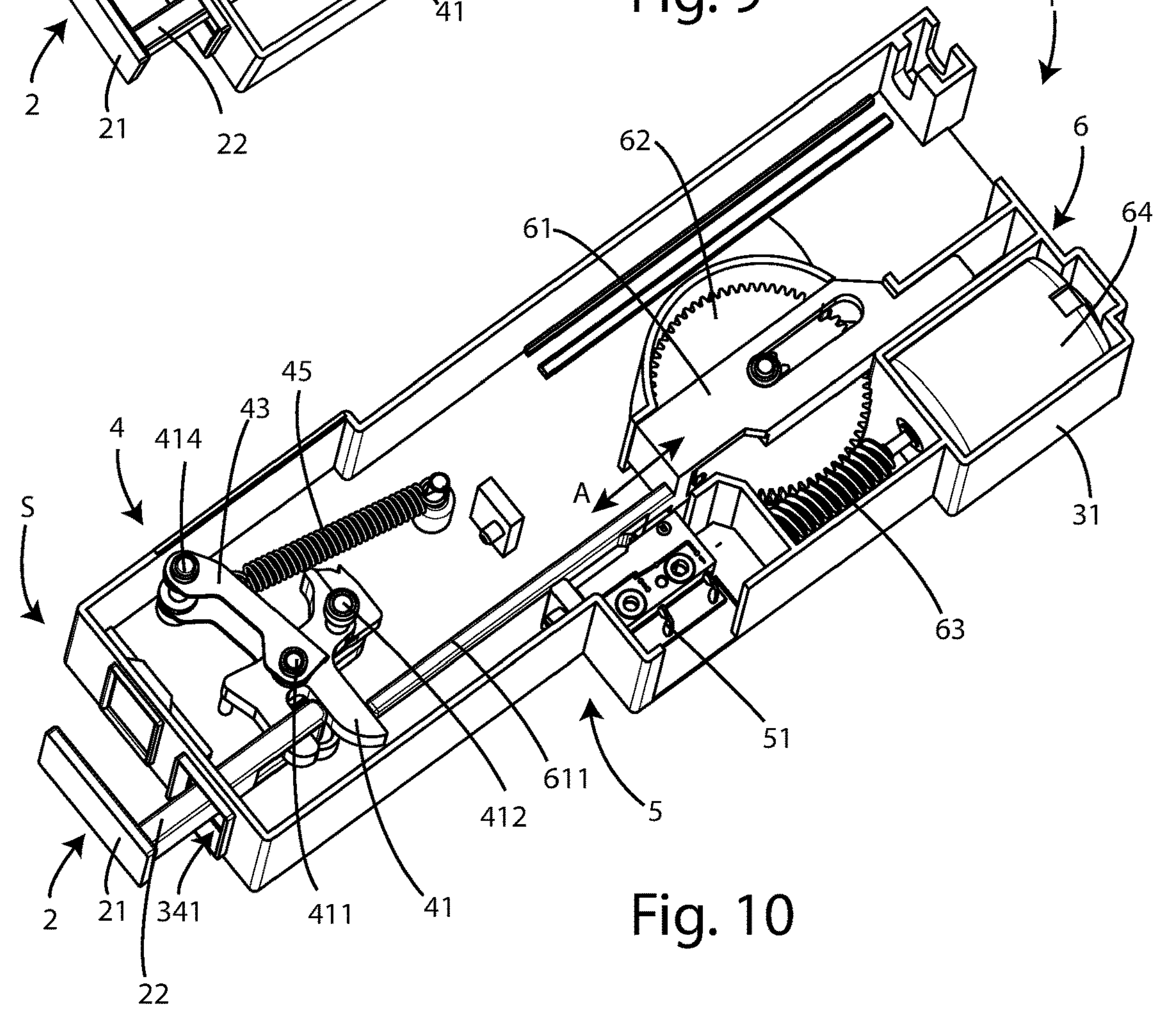
FIG. 10 shows a top perspective view of a third embodiment of the door-lock system, in which the coupling member has no safety member and the door-lock device has no security detection unit safety.

FIG. 10, on the other hand, shows a third embodiment of the door-lock system S according to the present invention, in which the engaging member 2 is without the security member 23 and the door-lock device 1 is without the security detection unit 7.

Figure 11:
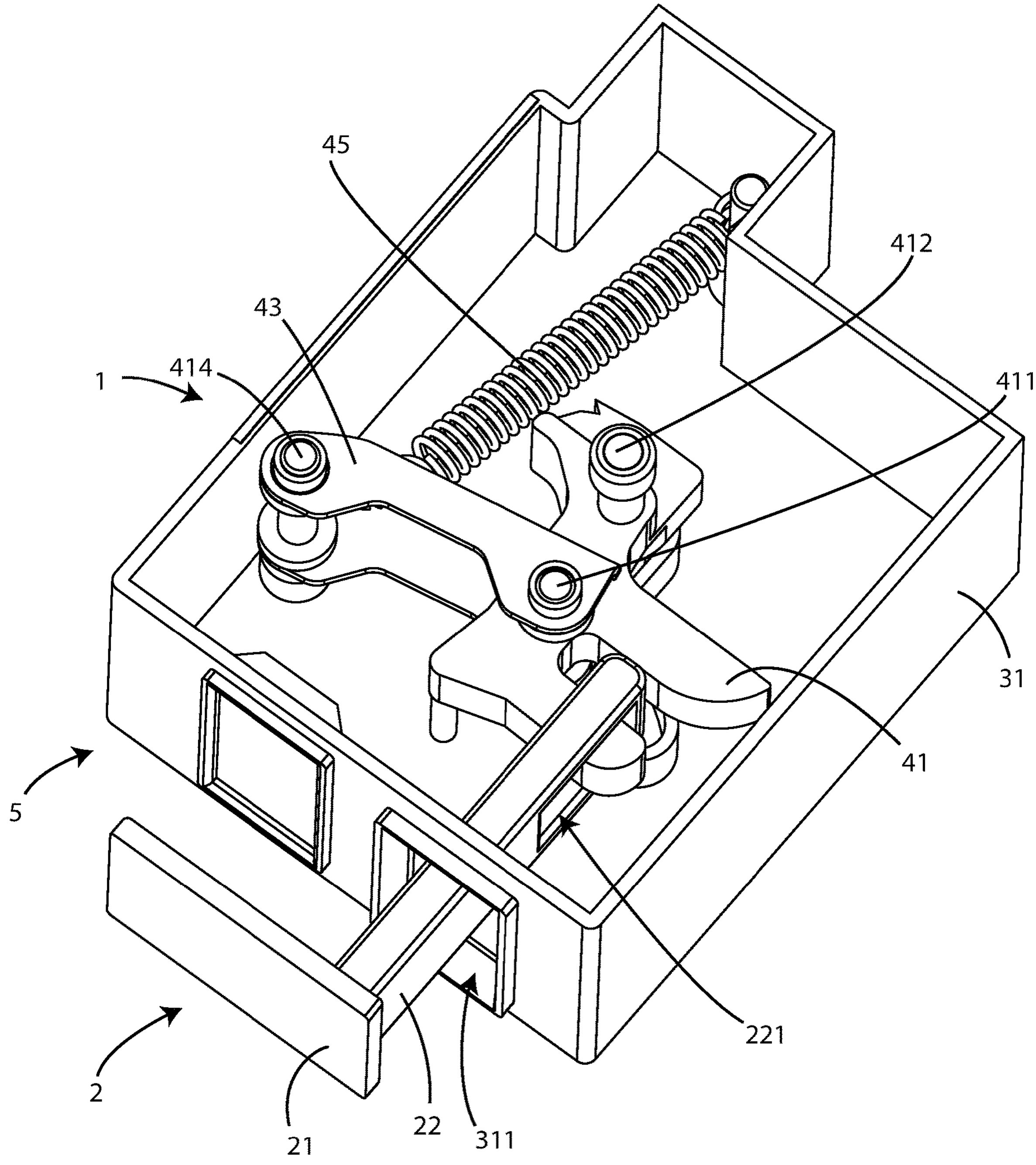
FIG. 11 shows a top perspective view of a fourth embodiment of the door-lock system, wherein the coupling member is without the safety member and the door-lock device has not the closure, safety detection unit, and retrieving group.

FIG. 11, on the other hand, shows a fourth embodiment of the door-lock system S according to the present invention, in which the engaging member 2 is without the security member 23 and the door-lock device 1 is without the locking detection unit 5, safety detection unit 7 as well as retrieving group 6.

Figure 12:
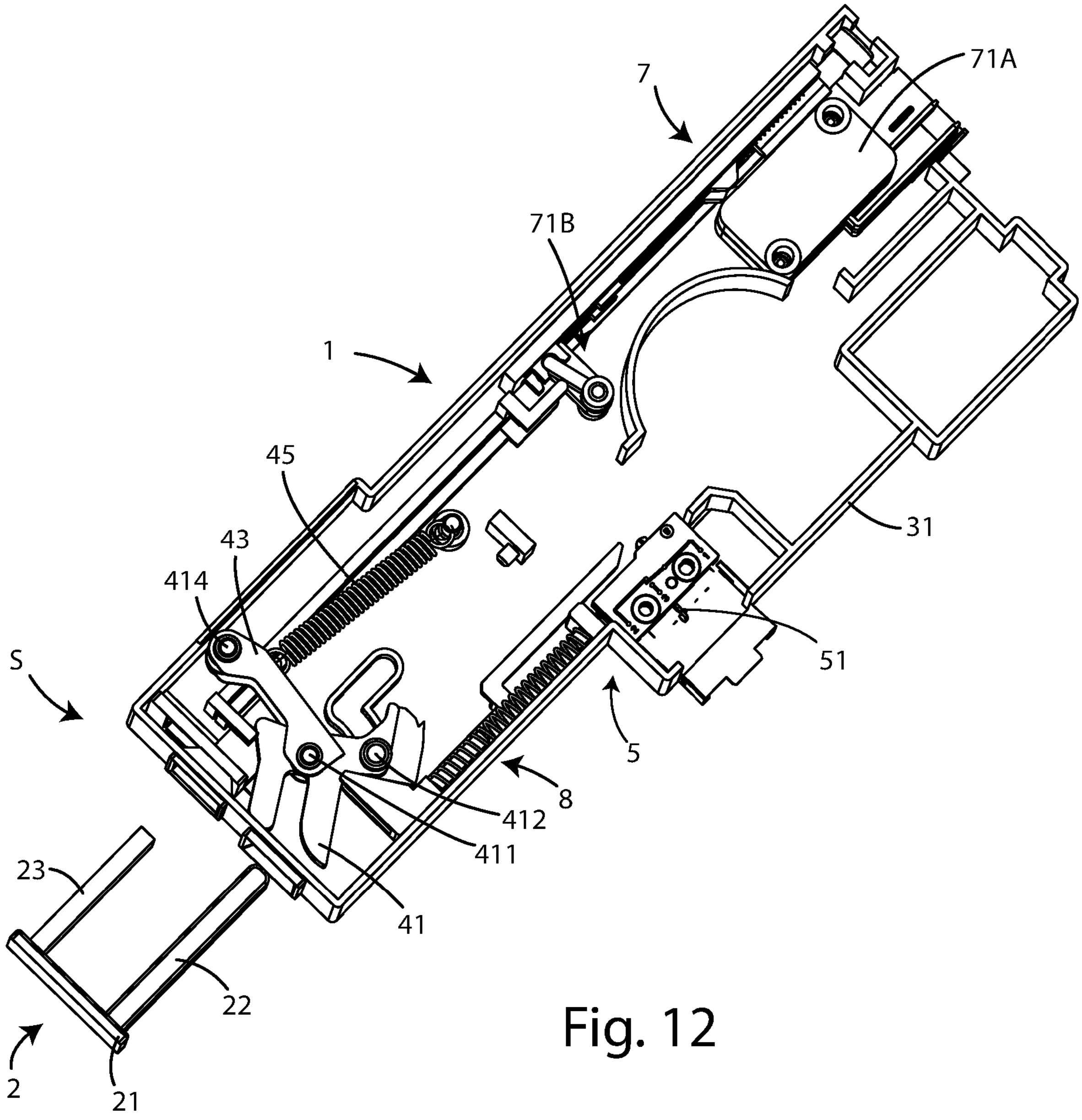
FIG. 12 shows a top perspective view of a fifth embodiment of the door-lock system, the door-lock device has no retrieving group and comprises a further blocking unit.
Figure 13:
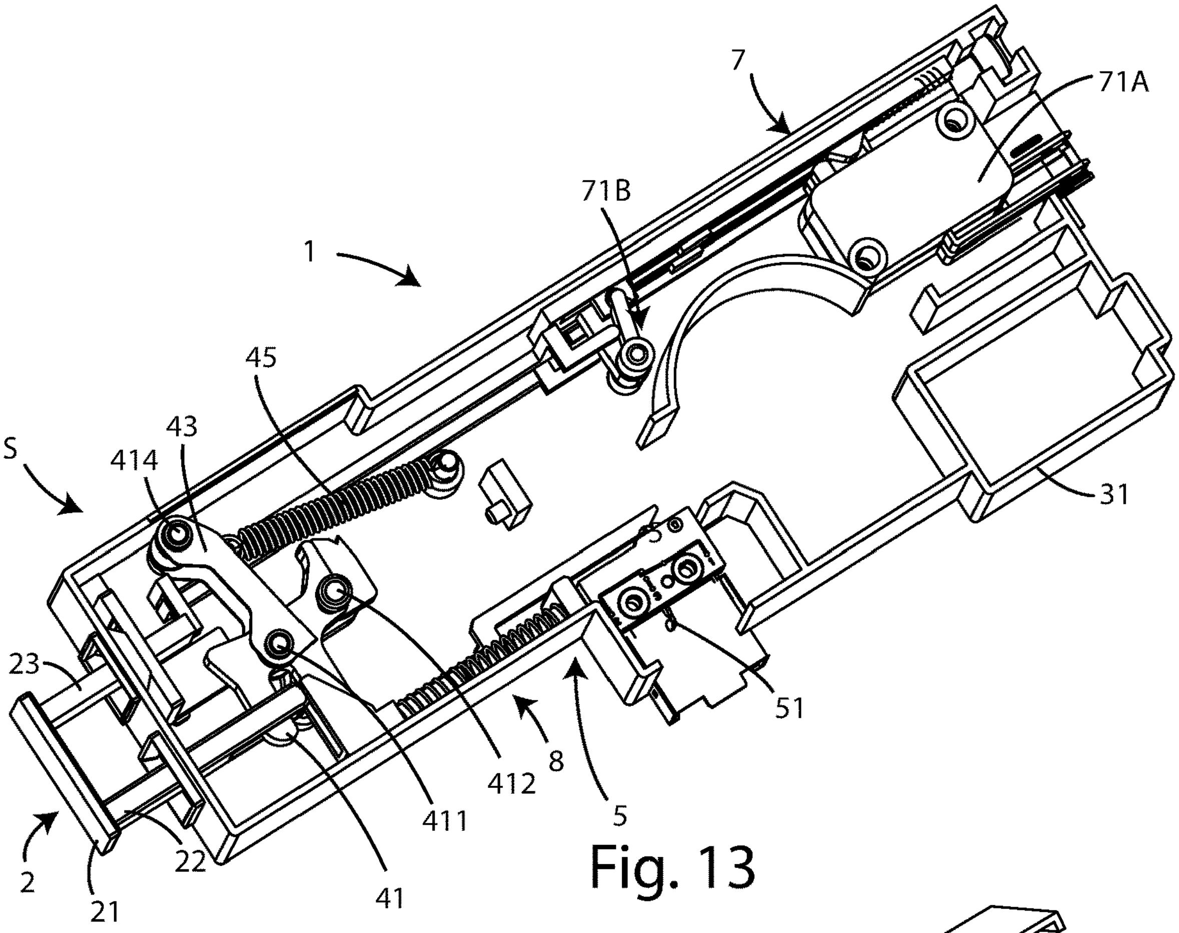
FIG. 13 shows, in a perspective view from above, the lock-door system of FIG. 12 when in use.

FIGS. 12 and 13 show a fifth embodiment of the door-lock system S according to the present invention, in which the door-lock device 1 has no retrieving group 6 and comprises a further blocking group 8.

Figure 14:
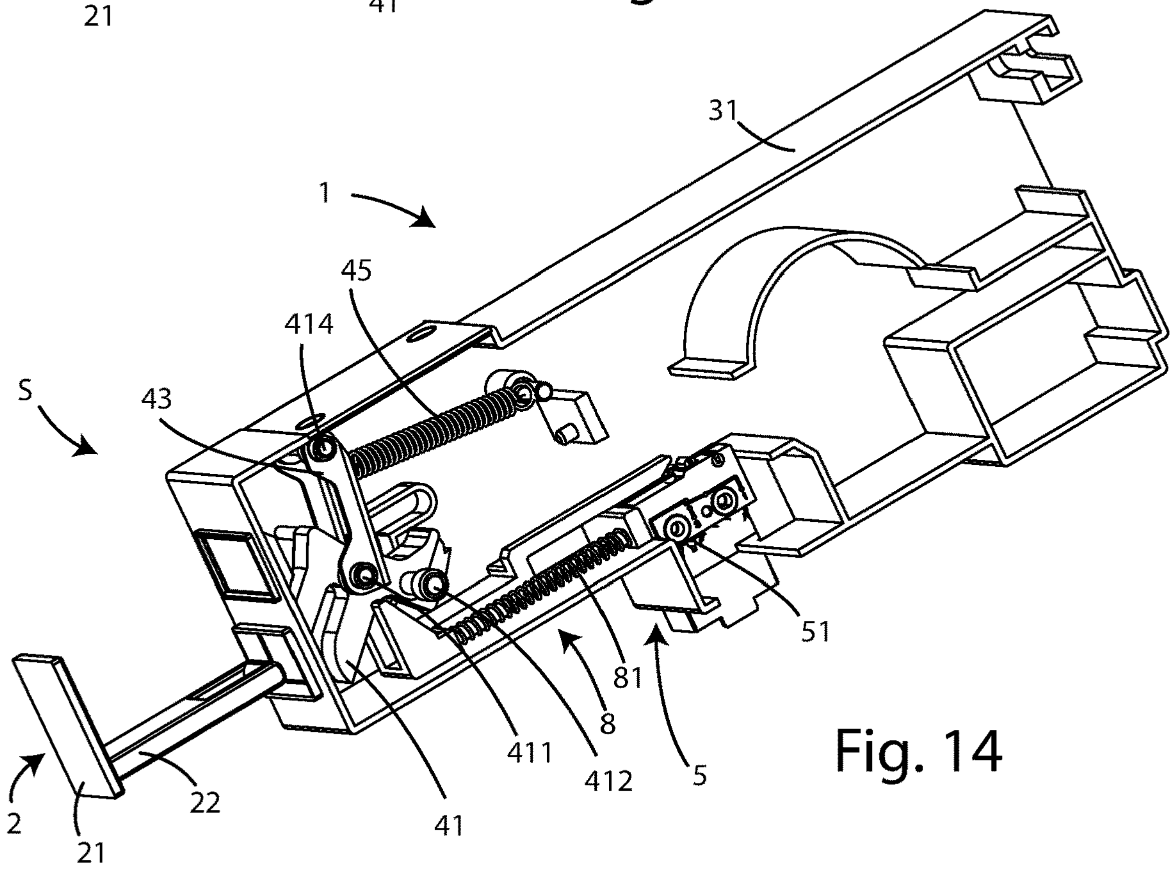
FIG. 14 shows a top perspective view of a sixth embodiment of the door-lock system, in which the engaging member has no safety member and the door-lock device has no security detection unit and retrieving group, and comprises the additional blocking group.
Figure 15:
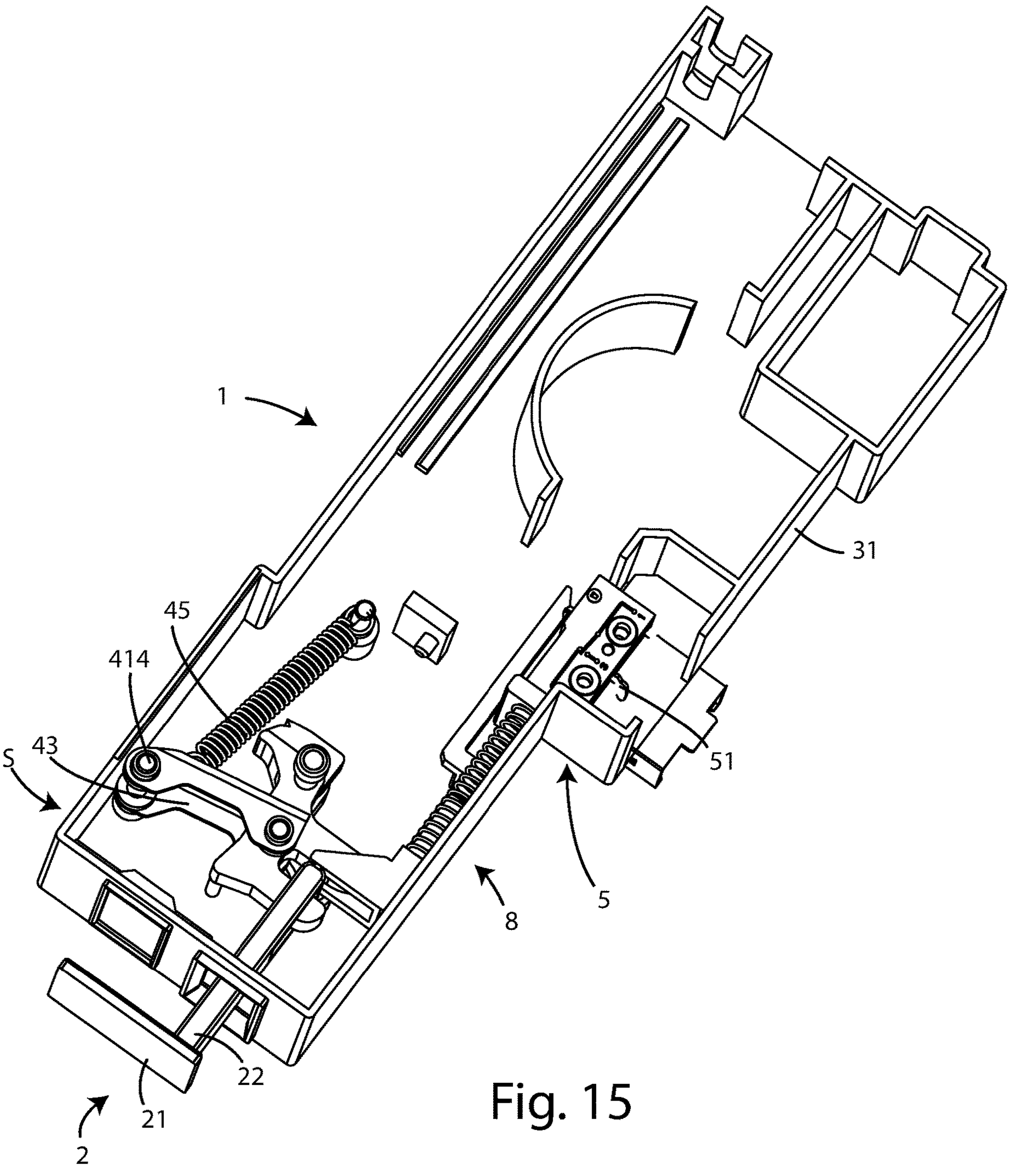
FIG. 15 shows, in a perspective view from above, the door-lock system of FIG. 14 when in use.

FIGS. 14 and 15 show a sixth embodiment of the door-lock system S, in which the engaging member 2 has no security member 23 and the door-lock device 1 has no detection unit 5. locking and call group 6 and includes the further blocking group 8.

Figure 16:
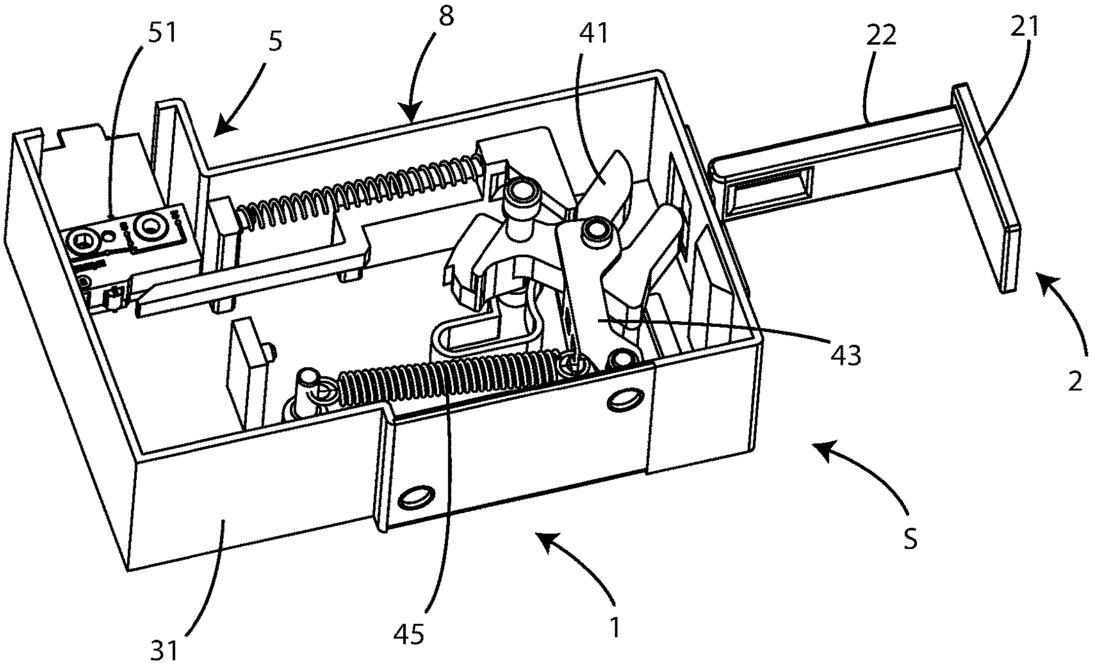
FIG. 16 shows, in perspective view, a seventh embodiment of the door-lock system.

FIG. 16 shows a seventh embodiment of the door-lock system S, in which the door-lock device 1 has a base 31 having a compact structure.

Figure 17:
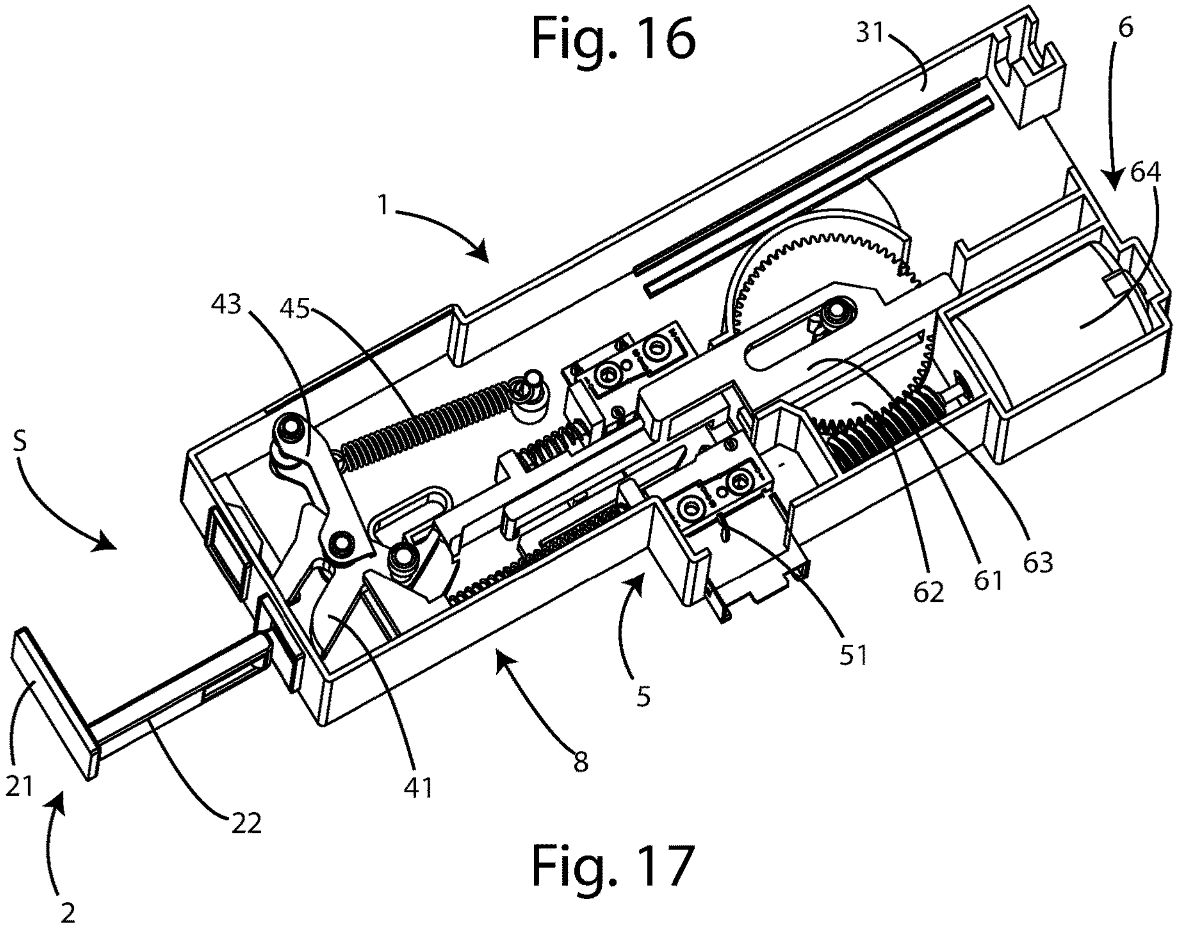
FIG. 17 shows, in a perspective view from above, an eighth embodiment of the door-lock system.

FIG. 17 shows an eighth embodiment of the lock-door system S.

For each embodiment described above, the further components not mentioned have the same structure and the same operation as the components already described for the first embodiment of the lock-door system S.

The operation of the lock-door system S described above is as follows.

With reference to FIGS. 1 and 2, when the prong 22 is inserted into said first opening 311, or in the closed condition of the door, the prong 22 interferes with said rotating hook 41, causing the rotation of said rotating hook 41 with respect to said first pin 411, and the sliding of said second free pin 412 on said guide of said support and guide element 42, overcoming the resistance of the spring 45 connected to the lever 43, which is constrained to said rotating hook 41 by means of the pin 411.

In fact, when the spring 45 is in the extracted position, it holds the lever 43, having the other end connected to the base 31 of the containment casing 3.

At the same time, the movement of the rotating hook 41 causes the sliding of said third free pin 413 on said guide of said second portion 443 and, therefore, the passage of said blocking member 44 from the closed position to the open position, by means of the sliding of the first portion 441 along the sliding guide 444, allowing the insertion of said security member 23 through the second opening 312.

Therefore, the security member 23 enters said second opening 312 and interferes with said second rod 72.

Therefore, the rotating hook 41 is in the operative position and the prong 22 is engaged and held by the rotating hook 41.

When, on the other hand, in the door opening condition, said electric motor 64 is activated manually or automatically, the lead screw 63 rotates, causing in turn the rotation of the toothed wheel 62. This allows the slider 61 to move along the direction A, towards said rotating hook 41.

In particular, the slider 61 pushes the first rod 611, the free end of which interferes with the rotating hook 41 causing the latter to rotate with respect to said first pin 411 and, therefore, the sliding of said second free pin 412 on said guide of said support and guide element 42, in the opposite direction with respect to what happens during the closing step of the door.

Therefore, the movement of the rotating hook 41 causes the expansion of the spring 45 and the sliding of the third free pin 413 on said guide of said second portion 443 and, therefore, the passage of said blocking member 44 from the open position to the closed position, by sliding the first portion 441 along the sliding guide 444, preventing the security member 23 from being inserted through the second opening 312.

Advantages

An advantage of the door-lock system according to the present invention is that of signaling, by means of the same device, the status of the door of the household appliance, the lock of the same door or the activation/deactivation of the appliance.

A further advantage of the door-lock system according to the present invention is that of providing the movable bulkhead synchronized with the movement of the rotating hook, so as to allow the insertion of the safety element only when the rotating hook is engaged with the prong of the household appliance.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. A door-lock system(s) for a household appliance, wherein said household appliance is of the type comprising a frame and a door hinged to said frame, and wherein said door-lock system(s) comprises:

an engaging member, fixable to said door of said household appliance, and comprising a prong and a security member arranged substantially parallel to said prong; and a door-lock device, comprising a containment casing fixable to the frame of said household appliance, a blocking group, intended to engage with and hold said engaging member, the blocking group comprises:

a rotating hook arranged within said containment casing, and capable of rotating from a resting position, in which said prong is not engaged with said rotating hook, to an operating position, in which said prong is engaged and blocked by said rotating hook, so as to hold said door closed;

a blocking member, related to said rotating hook, such that, when said rotating hook is in said resting position, said blocking member assumes a closing position, preventing the insertion of said security member within said containment casing, and that, when said rotating hook is in said operating position, said blocking member assumes an opening position, allowing the insertion of said security member within said containment casing;

a security detecting unit configured to interact with said security member, so as to detect when said security member is inserted or not inserted within the containment casing;

wherein said containment casing comprises a base and a lid, arranged on said base, for closing said containment casing, wherein said base has a first opening and a second opening arranged alongside said first opening;

wherein said prong is insertable in said first opening, and said security member is insertable in said second opening;

wherein said blocking member is arranged in the proximity of said second opening and is connected to said rotating hook;

wherein said base of said containment casing comprises a sliding guide fixed to said base;

wherein said blocking member comprises a first portion having an opening, and a second portion, fixed to said first portion and comprising a guide for said rotating hook, and wherein said first portion is constrained to slide along said sliding guide so that, when said blocking member is in said closing position, said second opening and said opening are not overlapping with each other, thereby preventing insertion of the security member through the second opening, and that, when said blocking member is in said opening position, said second opening and said opening are at least partially overlapping with each other, thereby allowing insertion of said security member through the second opening and said opening.

2. The door-lock system(s) according to claim 1, wherein said rotating hook comprises a third free pin constrained to said guide of said second portion of the blocking member so that, when said rotating hook is in said resting position, said blocking member assumes the closing position, and that, when said rotating hook is in said rotating position, said blocking member assumes the opening position.

3. The door-lock system(s) according to claim 1, wherein said security detecting unit comprises a second microswitch and a third microswitch, and a second rod arranged on one side of said base, and wherein each of said second and third microswitches is configured for detecting when said security member interferes or does not interfere with said second rod.

4. The door-lock system(s) according to claim 1, further comprising a closing detecting unit having a first microswitch configured for detecting when said rotating hook is engaged or disengaged with said prong.

5. The door-lock system(s) according to claim 1, wherein said blocking group further comprises a supporting and guiding element comprising a guide fixed to said base of said containment casing, wherein said rotating hook comprises a second free pin constrained to said supporting and guiding element in such a way so as to allow said rotating hook to rotate from said resting position to said operating position.

6. The door-lock system(s) according to claim 1, wherein said rotating hook further comprises a first pin around which said rotating hook is capable of rotating, and wherein said blocking group comprises a fourth pin, and a lever having one end connected, by means of said first pin, to said rotating hook and another end fixed, by means of said fourth pin, to said base of said containment casing.

7. The door-lock system(s) according to claim 1, further comprising a retrieving group comprising a slider, a gear wheel engaged with said slider, a lead screw engaged with said gear wheel, and an electric engine, whose shaft is coupled with said lead screw, so that, when in use, said electric engine causes the rotation of said lead screw and, thus, of said gear wheel, so that said slider is moved along a direction.

8. The door-lock system(s) according to claim 7, wherein said retrieving group further comprises a first rod, a free end of which is in proximity of said rotating hook, wherein said first rod is movable along said direction.

9. The door-lock system(s) according to claim 1, wherein said engaging member comprises a plate for fixing said engaging member to said door of said household appliance, wherein said prong is fixed to said plate and said security member, also fixed to said plate, has the shape of a bar and is arranged substantially parallel to said prong.

10. The door-lock system(s) according to claim 1, wherein said blocking member is a sliding wall.

11. An oven comprising a frame, into which a cooking chamber is defined, a door hinged to said frame for closing said cooking chamber, and a door-lock system(s) according to claim 1, wherein said engaging member (2) is fixed to said door, and wherein said door-lock device (1) is removably coupled with said engaging member (2).

12. The oven according to claim 11, wherein said door-lock system(s) is arranged in a lower or an upper part of said door.

13. The oven according to claim 11, wherein the door-lock system(s) comprises a first door-lock system(s) arranged in a lower part of said door and a second door-lock system(s) arranged in an upper part of said door.

* * * * *